United States Patent [19]
Kluge et al.

[11] Patent Number: 6,131,879
[45] Date of Patent: Oct. 17, 2000

[54] PIEZOELECTRICALLY ACTUATED MICROVALVE

[75] Inventors: Stefan Kluge; Peter Woias, both of München, Germany

[73] Assignee: Fraunhofer-Gesellschaft zur Förderung der angewandten Forschung e.V., Munich, Germany

[21] Appl. No.: 09/308,543

[22] PCT Filed: Nov. 13, 1997

[86] PCT No.: PCT/EP97/06344

§ 371 Date: May 20, 1999

§ 102(e) Date: May 20, 1999

[87] PCT Pub. No.: WO98/23868

PCT Pub. Date: Jun. 4, 1998

[30] Foreign Application Priority Data

Nov. 25, 1996 [DE] Germany ............................ 196 48 730
Aug. 13, 1997 [DE] Germany ............................ 197 35 156

[51] Int. Cl.[7] .................................................. F16K 31/02
[52] U.S. Cl. ...................... 251/129.06; 251/11; 137/831
[58] Field of Search ................................ 251/11, 129.06; 137/831, 832, 625.65

[56] References Cited

U.S. PATENT DOCUMENTS

| | | | |
|---|---|---|---|
| 3,174,716 | 3/1965 | Salter | 251/129.06 |
| 4,450,375 | 5/1984 | Siegal | 137/831 |
| 4,581,624 | 4/1986 | O'Connor | 137/831 |
| 5,333,831 | 8/1994 | Barth et al. | 251/11 |
| 5,340,081 | 8/1994 | Wright . | |
| 5,529,279 | 6/1996 | Beatty et al. . | |
| 5,927,325 | 7/1999 | Bensaoula | 251/129.06 |

FOREIGN PATENT DOCUMENTS

| | | |
|---|---|---|
| 0170173 | 7/1985 | European Pat. Off. . |
| 0704916 | 4/1996 | European Pat. Off. . |
| 2642812 | 2/1989 | France . |
| 4417251 | 11/1995 | Germany . |
| 19511022 | 6/1996 | Germany . |
| 3-103680 | 4/1991 | Japan . |
| 07158757 | 6/1995 | Japan . |

OTHER PUBLICATIONS

Rossberg et al., "Micro Liquid Dosing System", 1995, Microsystems Technologies.
Fernandez et al., "Properties of Piezoelectric Actuators", International Center for Actuators and Transducers.
Fernandez et al., "Tailoring Performance of Cymbal Actuators", International Center for Actuators and Transducers.

*Primary Examiner*—Kevin Shaver
*Assistant Examiner*—Eric Keasel
*Attorney, Agent, or Firm*—Beyer Weaver & Thomas, LLP

[57] ABSTRACT

A microvalve has a base element provided with a passage opening, a tappet, a suspension device for guiding the tappet, and a piezoelectric actuator for actuating the tappet. The suspension device guides the tappet relative to the base element in such a way that the passage opening can be closed or opened by the tappet. The longitudinal dimensions of the piezoelectric actuator can be changed by the application of an electric voltage. Longitudinally spaced ends of the piezoelectric actuator are connected to longitudinally spaced ends of the suspension device in such a way that the suspension device provides a way for mechanical translation between the actuator and the tappet. A change in the longitudinal dimensions of the piezoelectric actuator caused by the application of an electric voltage to the piezoelectric actuator is mechanically translated by the suspension device into a movement of the tappet essentially at right angles to the longitudinal direction so that the passage opening will be opened or closed. In addition, the suspension device is secured to the base element with the aid of a hinge-like element. At least two spaced points are used to secure the suspension device to the base element.

16 Claims, 5 Drawing Sheets

6,131,879

PIEZOELECTRICALLY ACTUATED MICROVALVE

This application is related to U.S. patent application Ser. No. 09/308,549 filed on May 20, 1999, and having the same title, which is hereby incorporated by reference.

BACKGROUND OF THE INVENTION

1. Field of the Invention

The present invention relates to micromechanically produced valves and especially to piezoelectrically operated micro-valves.

2. Description of Prior Art

Microvalves can generally be used in the fields of pneumatics and fluidics for controlling the flow of gases and liquids, i.e. fluid flows. Such a valve can either have the function of a pilot valve or it can directly be used for controlling a volume flow or a pressure in a working piston or the like.

Piezoelectrically operated microvalves which are known at present and which are based on the inverse piezoelectric effect comprise a large piezoelectric ceramic which is fixed at one end in most cases and by means of which the fluid flow is controlled directly. Such a piezoelectrically operated silicon microvalve is described in R. Rossberg, B. Schmidt, S. Büttgenbach: "Micro Liquid Dosing System", Microsystem Technologies 2 (1995), pages 11 to 16, Springer-Verlag 1995. In such microvalves, either the piezoelectric ceramic itself can serve as a valve tappet or the valve tappet used is a tappet which is directly guided by the piezoelectric ceramic.

The microvalves described in the above publication are disadvantageous insofar as, for obtaining the deflection of the valve tappet over the valve seat which is necessary for a high flow rate, a very long piezoelectric ceramic is required, said valve tappet being also referred to as valve flap. For accommodating such a piezoelectric ceramic, it is, of course, also necessary to use a correspondingly large casing. It follows that the known piezo-operated microvalves, which are described e.g. in the above-mentioned publication, have, in comparison with their construction size, a comparatively small valve opening, i.e. nominal width.

From A. Dogan, J. F. Fernandez, J. F. Tressler, K. Uchino, R. E. Newnham: "Properties of piezoelectric actuators"; Proceedings 5th International Conference on New Actuators 1996; Bremen Jun. 26th to 28th 1996, and J. F. Fernandez, A. Dogan, J. F. Tressler, K. Uchino, R. E. Newnham: "Tailoring performance of cymbal actuators", Proceedings 5th International Conference on New Actuators, Bremen Jun. 26th to 28th 1996, piezoelectric actuators are known, which consist of a piezoelectric ceramic material as a drive element which is arranged between two end covers having their edges connected to the ceramic material. By means of this arrangement, a lateral movement of the piezoelectric ceramic is converted into a large axial displacement at right angles to said end covers and amplified. As has been described in the publication "Tailoring performance of cymbal actuators", metals or metal alloys, e.g. zirconium, brass, low-carbon steel, molybdenum or tungsten, are used as end covers.

The Abstract of JP-A-07158757 discloses a microvalve comprising a base element provided with a passage opening which is adapted to be closed by means of a portion of increased thickness of a silicon diaphragm. The silicon diaphragm has attached thereto a piezoelectric actuator by means of which said silicon diaphragm can be displaced for opening and closing the passage opening. FR-A-2642812 describes a microvalve in which a tappet member is supported by means of piezoelectric diaphragmlike components, which are provided with planar electrodes, in such a way that a passage opening can be opened and closed by means of the tappet member.

SUMMARY OF THE INVENTION

It is an object of the present invention to provide piezoelectrically operated microvalves whose construction size is substantially smaller than that of known piezoelectrically operated microvalves.

In accordance with a first aspect of the present invention, this object is achieved by a microvalve comprising:

a base element provided with a passage opening;

a tappet;

a suspension device by means of which the tappet can be guided relative to the base element in such a way that the passage opening can be closed or opened by said tappet; and a piezoelectric actuator for actuating the tappet, the longitudinal dimensions of said piezoelectric actuator being adapted to be changed by the application of an electric voltage;

wherein longitudinally spaced ends of the piezoelectric actuator are connected to longitudinally spaced ends of the suspension device in such a way that the suspension device constitutes a means for providing a mechanical translation between the actuator and the tappet, wherein a change in the longitudinal dimensions of the piezoelectric actuator caused by the application of an electric voltage to said piezoelectric actuator is mechanically translated by said suspension device into a movement of the tappet essentially at right angles to said longitudinal direction whereby the passage opening will be opened or closed, and wherein the suspension device is secured, at least two spaced points thereof, to the base element with the aid of hingelike means.

In accordance with a second aspect of the present invention, this object is achieved by a microvalve comprising:

a base element provided with a passage opening;

a tappet;

a suspension device by means of which the tappet can be guided relative to the base element in such a way that the passage opening can be closed or opened by said tappet; and a piezoelectric actuator for actuating the tappet, the longitudinal dimensions of said piezoelectric actuator being adapted to be changed by the application of an electric voltage, wherein the tappet closes the passage opening when no electric voltage is applied to the piezoelectric actuator and leaves said passage opening open when a voltage is applied to said piezoelectric actuator, wherein the piezoelectric actuator is attached to the base element by a fastening device on the side facing away from the tappet and the suspension device, said piezoelectric actuator being provided with at least one passage opening which is in fluid communication with the passage opening in the base element via the fastening device, and said tappet closing the passage opening of said base element by closing the passage opening of the actuator, wherein longitudinally spaced ends of the piezoelectric actuator are connected to longitudinally spaced ends of the suspension device in such a way that the suspension device constitutes a means for providing a mechanical translation between the actuator and the tappet, wherein a change in the longitudinal dimensions of the piezoelectric actuator caused by the application of an electric voltage to said piezoelectric actuator is mechanically translated by said suspension device into a movement of the tappet essentially at right angles to the longitudinal direction whereby the passage opening will be opened or closed.

The present invention refers to a special construction of microvalves, which utilize the inverse piezoelectric effect as a drive mechanism, and in particular to a special structural design of the piezoelectric drive mechanism permitting, in combination with a reduced construction size of a piezoelectrically operated microvalve, a deflection that is required for a high flow rate. This piezoelectric actuator, which can also be referred to as a piezoelectric ceramic, can be used for microvalves with different numbers of paths and switching states. A 2/2-NO (=normally open) microvalve has e.g. two paths and two switching states and is normally open, i.e., when the actuator does not have a voltage applied thereto, one path of the valve, i.e. one passage opening, will not be closed by the valve tappet. A 2/2-NC (=normally closed) valve has two paths and two switching states, one passage opening being closed in the non-operative state. Furthermore, valves with three paths and two switching states or higher order valves can be realized.

By means of the microvalve according to the present invention, the construction size of piezoelectrically operated valves can substantially be reduced on the basis of a mechanical translation between a tappet and a piezoelectric actuator, said mechanical translation being provided by the suspension device of the tappet. By means of the lever translation, a comparatively small lateral shrinkage, i.e. a change in the dimensions of the piezoelectric ceramic in the longitudinal direction, is converted into a comparatively high vertical deflection of the valve tappet over the valve seat, i.e. a high deflection at right angles to the longitudinal dimensions of the piezoelectric ceramic. This permits large opening widths of the valve to be realized on a small area. In contrast to the hitherto known embodiments, the valves according to the present invention which will be described hereinbelow can, moreover, be mounted making use of a full-wafer connection technique which is generally used in the field of semiconductor technology. This means that a large number of identical components can be produced side by side on a substrate at the same time. The individual valves are then produced by dicing at the end of the manufacturing process. The use of this so-called batch process will increase the reproducability of the component specifications. By means of this kind of production it is possible to save costs, since the structures can be produced simultaneously, and to simplify production because the function can already be tested in the composite wafer structure.

The construction size of piezoelectrically operated microvalves having a structural design according to the present invention can be reduced drastically in comparison with known microvalves, the flow rate remaining, however, the same. This permits a higher packing density, e.g. in the case of so-called valve islands, so that e.g. pneumatically controlled machines can be reduced in size or actually be realized. Especially the use of microvalves in the field of motor vehicles is closely coupled with the construction size and the resultant weight of the microvalves. In addition, higher flow rates can be achieved when the hitherto used construction size is maintained. It follows that faster switching times, e.g. of working pistons, can be achieved. Due to the reduced construction size required for a given flow rate, the costs for the casing will be reduced as well.

In advantageous embodiments of the present invention, the suspension device is attached to the base element by means of at least one hinge at at least two spaced points of said suspension device. The suspension device, the tappet and the hingelike fastening of the suspension on said base element are formed preferably integrally from a micromechanically produced chip. Hence, the present invention permits a stress-free rotational movement of the tappet chip, although a sufficiently large area of the tappet chip is attached to the base plate.

Further developments of the present invention are disclosed in the dependent claims.

BRIEF DESCRIPTION OF THE DRAWINGS

In the following, preferred embodiments of the present invention will be explained in detail making reference to the drawings enclosed, in which.

DESCRIPTION OF PREFERRED EMBODIMENTS OF THE INVENTION

Figure 1A:
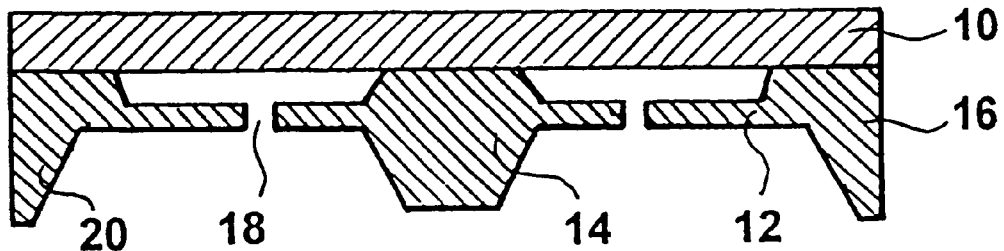
FIGS. 1A and 1B show schematic cross-sectional views for illustrating the piezoelectric actuator for a microvalve according to the present invention.
Figure 1B:
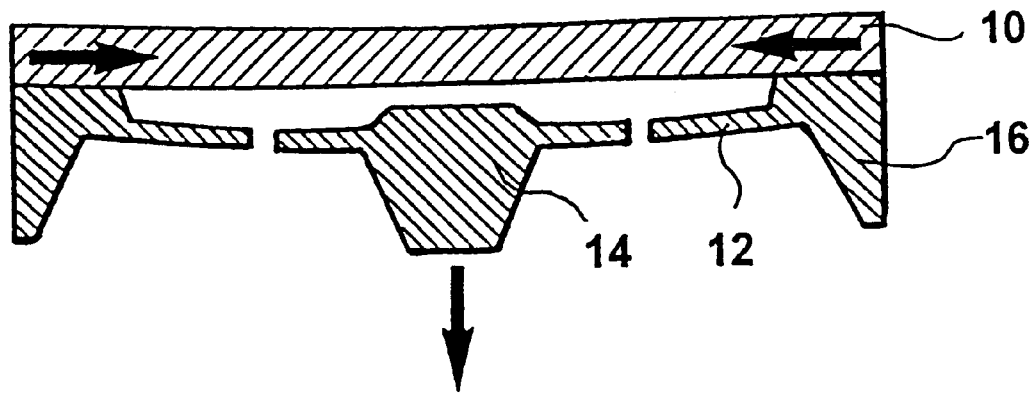

An actuator, which consists of a piezoelectric ceramic and of a tappet 14 secured to said piezoelectric ceramic 10 by means of a suspension device 12, is shown in FIGS. 1A and 1B. The piezoelectric ceramic 10 serves as the actual drive. A voltage can be applied to the piezoelectric ceramic 10 in the usual way via electrodes (not shown) which are attached thereto.

The piezoelectric ceramic 10 has attached thereto a micromechanically structured chip 16. In a preferred embodiment of the present invention, the chip is a semiconductor chip. The micromechanically structured chip 16 can be produced e.g. by means of conventional etching techniques. The chip material used can e.g. be silicon. Alternatively, the chip can also be a chip produced by means of an injection moulding process, e.g. a LIGA process (LIGA=lithography, electroforming), and can therefore consist of plastic material.

In the actuator shown in FIGS. 1A and 1B, the chip is fixedly connected to the piezoelectric ceramic at all edges, whereas the tappet 14, which is located substantially at the centre of the micromechanically structured chip and which is secured to the elastic suspensions 12, is vertically movable. In a 2/2-way valve it is, however, not absolutely necessary that the chip is connected to the piezoelectric ceramic at all edges, since for the mode of operation of the piezoelectric actuation of the tappet according to the present invention it will suffice when the chip is connected to the piezoelectric ceramic at least at two spaced, preferably opposed ends thereof, the tappet being arranged in an area between the chip sections secured to the piezoelectric ceramic.

The elastic suspensions 12 can consist of a diaphragm which may be provided with openings 18 for pressure compensation. The elastic suspensions may, however, also consist of individual strips connecting the tappet 14 to the part of the micromechanically structured chip 16 which is secured to the piezoelectric ceramic. The micromechanically produced chip is provided with a border 20 extending away from the piezoelectric ceramic 10, said border being provided along the periphery of said chip and being used for fastening the actuator to a valve base element.

FIG. 1A shows the condition of the actuator when no voltage is applied to the piezoelectric ceramic 10. When a voltage is applied to the piezoelectric ceramic, the lateral dimensions of said piezoelectric ceramic 10 will diminish. This is shown by the arrows in the figures extending parallel to the piezoelectric ceramic, said arrows being shown e.g. in FIG. 1B. The micromechanically structured chip 16 which is connected to the piezoelectric ceramic 10 along the border thereof, is compressed when said lateral dimensions diminish; due to the lateral compressive stress occurring in the micromechanically structured chip 16, the tappet 14 tends to move in the vertical direction. This is indicated by the arrow in FIG. 1B. When the chip 16 has a suitable structural design, a lever action can be achieved in this way, which translates the small lateral shrinkage of the piezoelectric ceramic 10 into a high vertical deflection of the tappet 14 and which permits a large valve opening width in this way, whereas in microvalves having a conventional structural design the valve tappet follows directly the movement of the piezoelectric ceramic and its deflection is therefore limited to the deflection value of the piezoelectric ceramic.

Figure 2A:
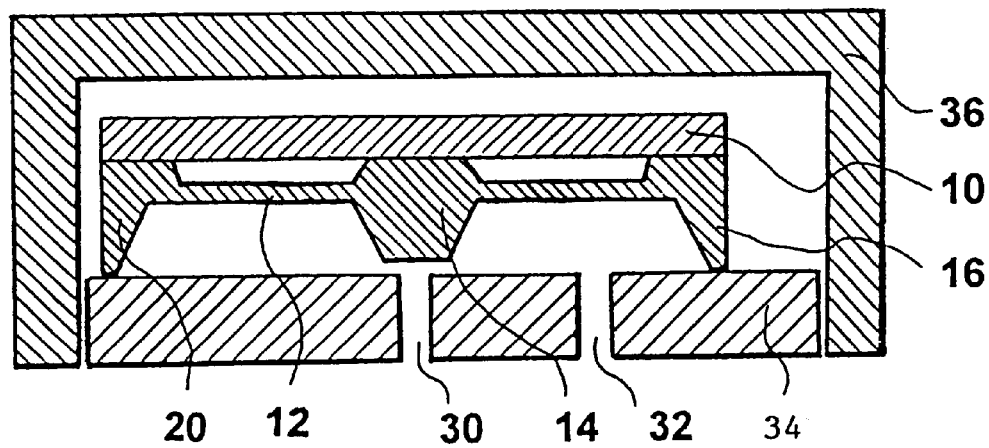
FIGS. 2A and 2B show schematic cross-sectional views of a first embodiment of a microvalve according to the present invention in the non-operative state and in the operative state, respectively.
Figure 2B:
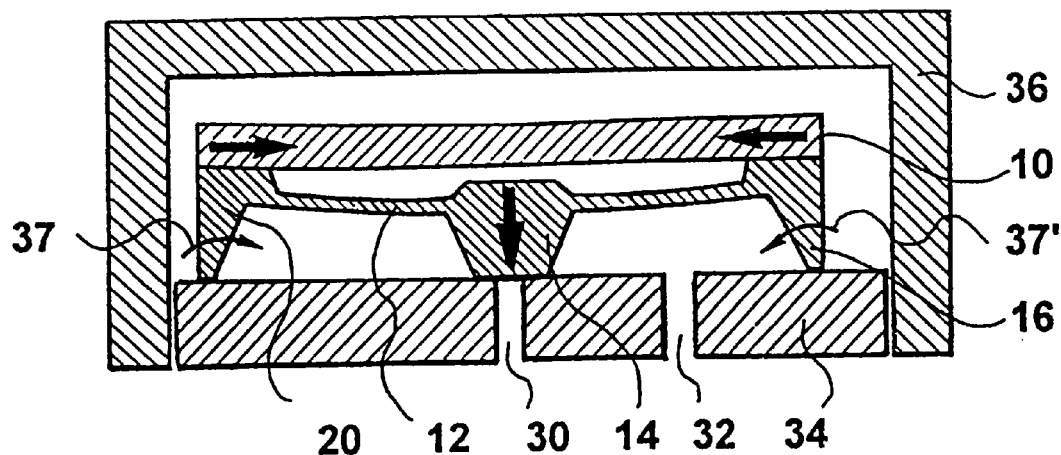

In FIGS. 2A and 2B, a first embodiment of a microvalve according to the present invention is shown. The valve in question is a 2/2-No microvalve, which is provided with two paths, i.e. two passage openings, and two switching states, the microvalve being open in the deactivated state. In the embodiment of the microvalve according to the present invention shown in FIGS. 2A and 2B, the valve openings 30 and 32 are provided in a base plate 34 consisting e.g. of ceramics. In addition, the base plate 34 can also be used for electric contacting. The valve openings 30 and 32 have fluid connections (not shown) attached thereto, e.g. a consumer connection and a pressure connection.

The base plate 34 has secured thereto a microstructured tappet chip 16 along its border, i.e. along its peripheral projection 20, in such a way that the tappet 14 is freely movable in the middle of the micromechanically structured chip 16, said tappet chip 16 corresponding in this embodiment to the chip shown in FIGS. 1A and 1B. The micromechanically structured chip 16 has additionally attached thereto a piezoelectric ceramic 10, as has been described with reference to FIGS. 1A and 1B. The side of the tappet 14 facing the base plate 34 is slightly set back relative to the surface of the base plate 34, whereby the height of the valve opening is defined.

In the embodiment shown in FIGS. 2A and 2B, the chip edge facing the base plate 34, i.e. the surface of the peripheral projection 20 secured to the base plate 34, is very narrow; this permits a stress-free rotational movement of the tappet chip. In the embodiment shown, the base plate 34 has additionally attached thereto a casing cover 36 which encapsulates the above-described arrangement and which can additionally be used as a gas guide means.

When an electric voltage is applied to the piezoelectric ceramic 10, said piezoelectric ceramic 10 will change its dimensions in the longitudinal direction, i.e. its lateral dimensions will diminish. In FIG. 2B this is again indicated by arrows extending parallel to the longitudinal dimensions of the piezoelectric ceramic 10. In the course of this process, the microstructured tappet chip 16, which is connected to the piezoelectric ceramic 10 along the border thereof, is compressed and tends to reduce the resultant lateral compressive stress by getting out of the way in the vertical direction. This vertical movement of the tappet 14 has the effect that the passage opening or valve opening 30 of the base plate 34 is closed. On the basis of the structural design of the microstructured tappet chip 16, a translation of a small lateral contraction of the piezoelectric ceramic 10 into a high vertical deflection of the tappet 14 can be achieved. The arrows 37 and 37' shown in FIG. 2B additionally indicate the almost stress-free rotatability of the tappet chip which is guaranteed by the narrow fastening area of the microstructured tappet chip on the base plate 34. By selecting the direction of the fluid flow through the valve, opening or, alternatively, closing of the valve can be supported, whereby an improved leak rate behaviour will be obtained.

Figure 3:
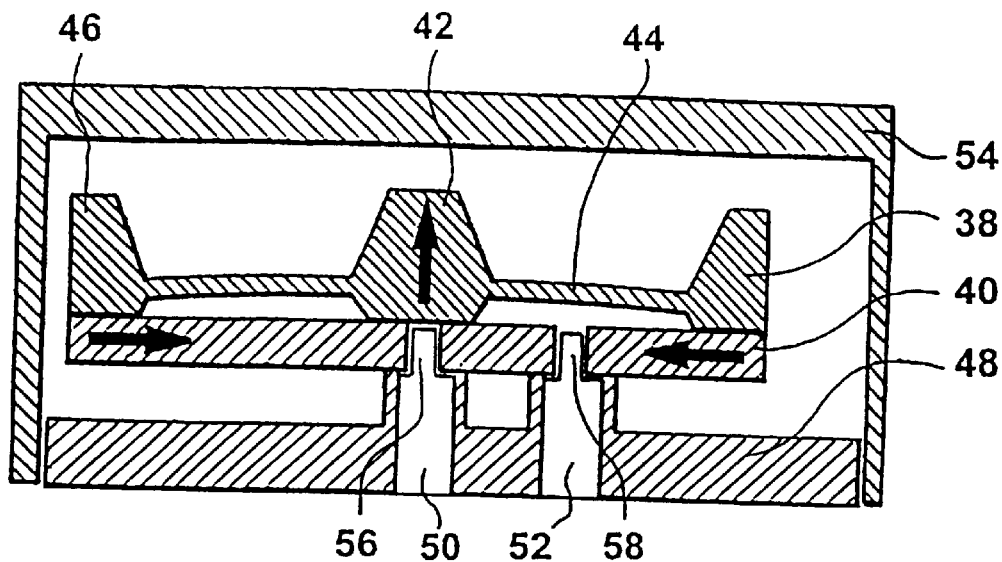
FIG. 3 shows a schematic cross-sectional view of a second embodiment of a microvalve according to the present invention in the non-operative state.

FIG. 3 shows a second embodiment of the present invention. This embodiment is a 2/2-NC valve, which is provided with two paths and two switching states and which is closed in the deactivated state. In the embodiment shown in FIG. 3, a micromechanically structured tappet chip 38 is again attached to a piezoelectric ceramic 40. The tappet chip 38 is again provided with a tappet 42 attached via an elastic suspension 44 to a part 46 of the tappet chip 38 which is connected to the piezoelectric ceramic 40 along the periphery of the tappet chip. In this case, the tappet chip is mounted on the piezoelectric ceramic 40 in such a way that the tappet 42 has already applied thereto a certain amount of mechanical prestress due to the mounting process and rests on the valve seat, whereby said valve seat is closed.

The embodiment shown in FIG. 3 again comprises a base plate 48, which consists e.g. of ceramics and which has two valve openings 50 and 52, and a casing cover 54. In this embodiment also the piezoelectric ceramic 40 is, however, provided with two passage openings 56 and 58. Via a fastening device, which, however, permits a lateral expansion and contraction of the piezoelectric ceramic 40, said piezoelectric ceramic 40 is connected to the base plate 48 in such a way that a fluid connection is established between the valve opening 50 of the base plate 48 and the passage opening 56 of the piezoelectric ceramic 40 and in such a way that the valve opening 52 of the base plate 48 is connected to the passage opening 58 of the piezoelectric ceramic 40.

In cases in which no voltage is applied to the piezoelectric ceramic, the tappet 42 of the embodiment of the present invention shown in FIG. 3 closes the passage opening 56 in the piezoelectric ceramic 40 and, consequently, the valve opening 50 in the base plate 48, which is in fluid communication with said passage opening 56. When a voltage is applied to the piezoelectric ceramic 40, the longitudinal dimensions of said piezoelectric ceramic will diminish due to the inverse piezoelectric effect, said shrinkage being translated into an upward vertical movement of the tappet 42. This has the effect that the passage opening 56 in the piezoelectric ceramic 40 is opened and the valve opening 50 in the base plate 48 is therefore opened as well. In this valve the direction of the fluid flow can be chosen such that closure of the valve is supported. This will improve the closure and leak rate behaviour.

Figure 4:
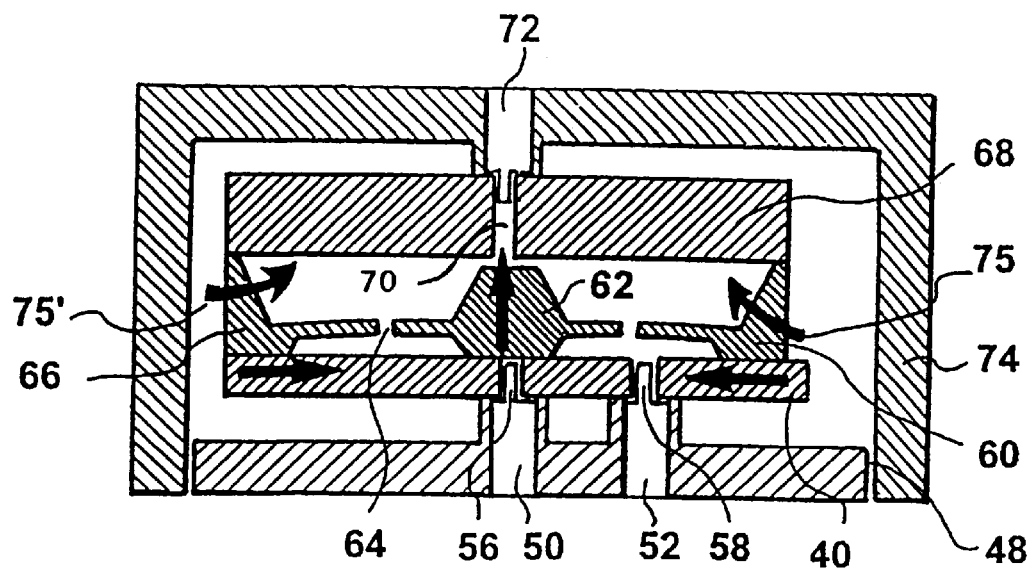
FIG. 4 shows a schematic cross-sectional view of a fourth embodiment of a microvalve according to the present invention in the non-operative state.

A third embodiment of a microvalve according to the present invention is shown in FIG. 4. In the embodiment shown in FIG. 4, the base plate 48 with passage openings 50, 52 and the piezoelectric ceramic 40 with passage openings 56 and 58 have the same structural design as in the case of the embodiment which has been described making reference to FIG. 3. The piezoelectric ceramic has again arranged thereon a micromechanically structured tappet chip 60. The elastic suspensions by means of which the tappet 62 is secured to the part of the tappet chip 60 fastened to the piezoelectric ceramic 40 are provided with fluid passages which are shown as openings 64, by way of example.

The micromechanically structured tappet chip 60 is again provided with a peripheral projection 66 having arranged thereon a further valve seat 68 in the third embodiment according to the present invention. The valve seat 68 is provided with a passage opening 70. The passage opening 70 is in fluid communication with a passage opening 72 of a casing cover 74 encapsulating the arrangement described. The almost stress-free rotatability, which is guaranteed by the narrow upper surface of the peripheral projection 66, is again indicated by the arrows 75 and 75' in FIG. 4.

The microvalve shown in FIG. 4 can be referred to as a 3/2-way valve. Such a valve has 3 paths and 2 switching states. In such a valve, a second valve seat is, of course, required. In the embodiment shown, this second valve seat is implemented by means of a further chip consisting e.g. of ceramics, silicon or the like. In such a 3/2 way valve, which has been described, by way of example, making reference to FIG. 4, the tappet chip is fully connected along its whole periphery to the piezoelectric ceramic as well as to the second valve seat, since fluid is conducted through the space between the chip and the piezoelectric ceramic and through the space between the chip and the second valve seat.

In the microvalve shown in FIG. 4, the valve opening 50 is closed in the strain-free condition of the piezoelectric ceramic 40. When a voltage is applied to the piezoelectric ceramic 40, the longitudinal dimensions of said piezoelectric ceramic 40 will diminish, whereby an upward vertical movement of the tappet 62 will be caused. The tappet 62 then closes the passage opening 70 in the second valve seat 68 and, consequently, the opening 72 in the casing cover 74.

For reasons of safety, 3/2 way valves are operated in the normally-closed mode in most cases, i.e. they are closed when no energy is applied. For this reason, it will be advantageous when the prestress applied to the valve tappet in the mounting process is chosen so high that, even if pressure is applied from below, the tappet will remain on the valve seat and the valve will therefore remain closed.

Deviating from the specially described embodiments, the present invention also comprises microvalves which differ from the above-described embodiments with regard to their structural design, the arrangement of the passage openings, etc., as long as valve tappet of these microvalves is actuated in the manner described in accordance with the present invention.

Hence, the present invention provides microvalves permitting comparatively large passage openings in combination with a comparativley small construction size. In addition, the microvalves according to the present invention permit a production of said microvalves by means of a full-wafer connection technique which is generally used in the field of semiconductor technology. It follows that, in comparison with known microvalves, the microvalves according to the present invention offer advantages with regard to simple production and, in addition, with regard to costs that can be saved when such microvalves are produced.

Making reference to FIGS. 5A, 5B and 6, a fifth and a sixth embodiment of the microvalve according to the present invention will be described in the following. Parts corresponding to those shown in FIGS. 1 to 4 have been designated by the same reference numerals, said parts being not described separately once more.

Figure 5A:
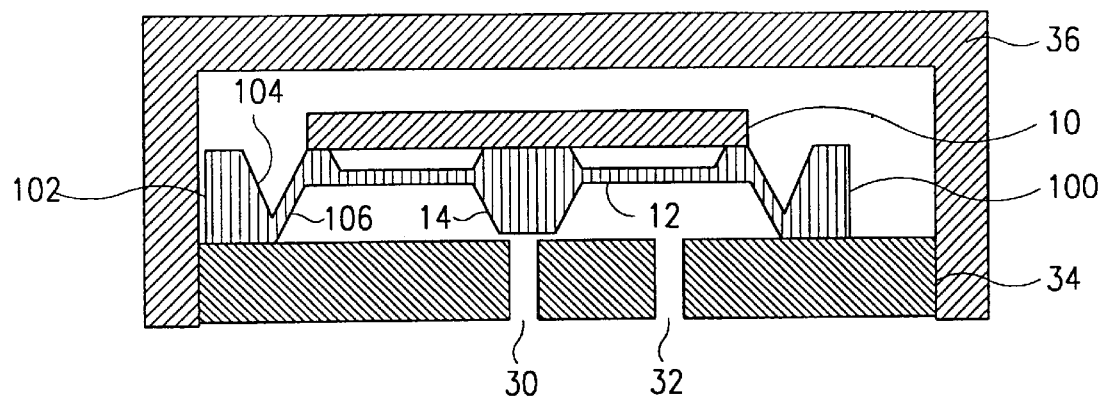
FIGS. 5A and 5B show a schematic cross-sectional view of a fifth embodiment of a microvalve according to the present invention in the non-operative state and in the operative state, respectively.
Figure 5B:
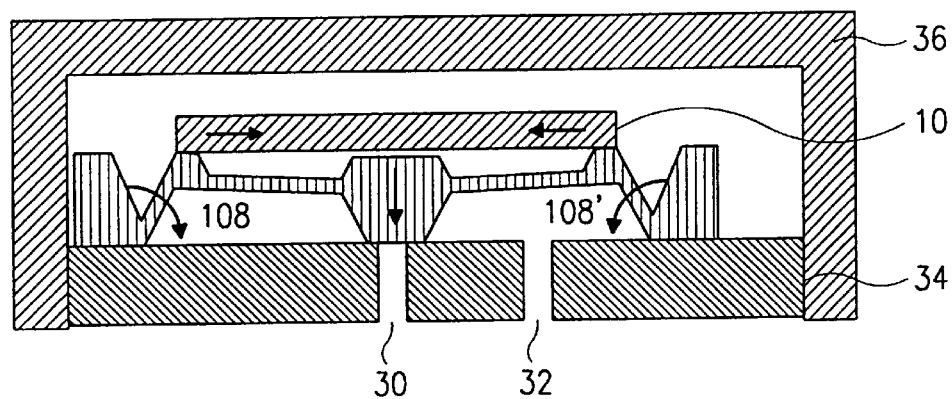

The fifth embodiment shown in FIGS. 5A and 5B differs from the microvalve shown in FIGS. 2A and 2B with regard to the fact that the micromechanically produced chip 100 has now a broader peripheral projection 102 having provided therein a recess 104 in the surface facing away from the base element 34. This recess defines together with the recess defined by the configuration of the suspension device and the tappet a bridge 106 cooperating with the peripheral projection 102 so as to define a hinge.

The arrows 108 and 108' in FIG. 5B show how this provision of a hinge at the points where the suspension device 12 is fastened to the base element 34 permits a stress-free rotational movement of the tappet chip 100, i.e. of the suspension device 12, and, consequently, a stress-free opening and closing of the opening 30 of the base plate. A hinge can be provided at a plurality of locations along the periphery of the tappet chip 100. Alternatively, a single hinge can fully surround the tappet chip along the periphery thereof. When the hinge fully surrounds the tappet chip 100, the opening 32 must be arranged in the base element 34 within the area enclosed by this hinge. If the tappet chip is, however, not connected to the base plate 34 along the whole periphery thereof, it must only be guaranteed that the openings 30 and 32 are in fluid communication when the opening 30 is open. The tappet chip 100 may consist e.g. of silicon, whereas the casing 36 may consist e.g. of plastic material.

Figure 6:
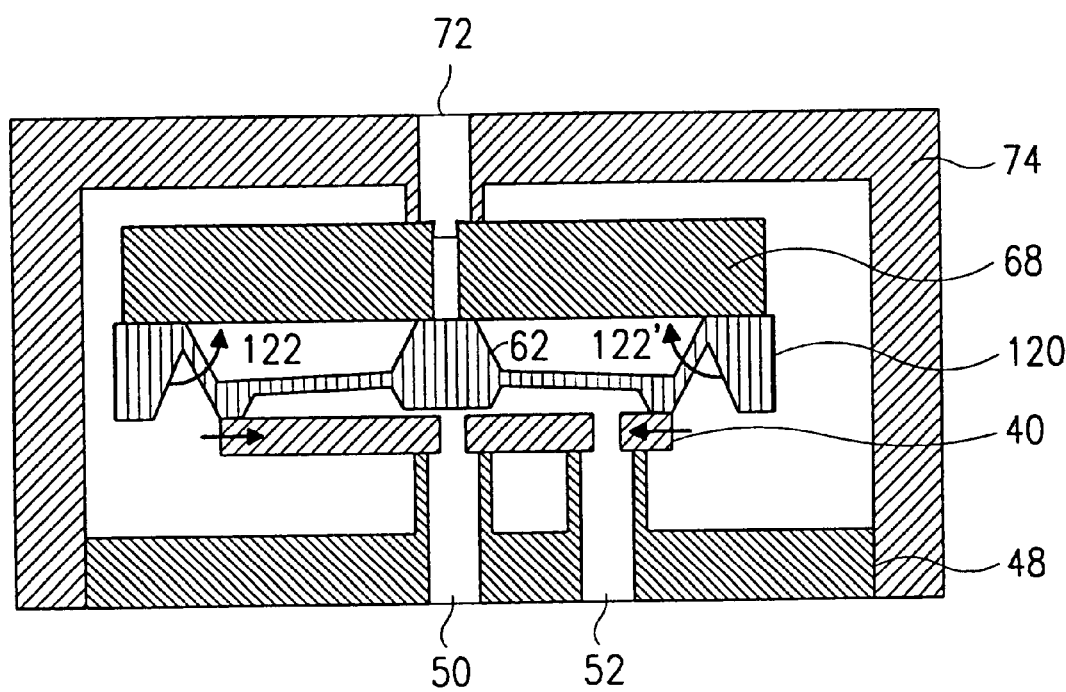
FIG. 6 shows a schematic cross-sectional view of a sixth embodiment of a microvalve according to the present invention in the operative state.

FIG. 6 shows a sixth embodiment according to the present invention, which corresponds essentially to the embodiment that has been described with regard to FIG. 4, the way in which the tappet chip 120 is attached to the base plate 68 being, however, different also in this case. The tappet chip 120 is again attached to the base plate 68 after the fashion of a hinge, the stress-free rotatability of the tappet chip 120 being indicated by the arrows 122 and 122' in FIG. 6. The structural design of the hingelike fastening corresponds again to the one shown in FIGS. 5A and 5B.

By means of the structural design described with regard to the fifth and sixth embodiments, the functional performance of the piezoelectrically operated microvalve can be improved. By decoupling the rotational movement from the fastening of the structured silicon chip on the base plate, an optimized fastening in the form of a larger adhesive area as well as a reproducable behaviour with regard to the rotational movement are obtained. This is due to the fact that the hinge can be manufactured very accuarately by micromechanical means and is therefore much more precise than an adhesive joint. When an adhesive joint is used, loads occur which will result in aging and, consequently, in a change of the mechanical properties. This will automatically change the long-term behaviour of the flow characteristic of the valve. On the basis of the embodiments of the present invention which have been described with reference to FIGS. 5A, 5B, and 6, a possibility of utilizing the non-aging elastic bending of the silicon has been found. Hence, an increased flow rate can be expected, since the rotational movement can be achieved with less expenditure of energy. This has the effect that a higher percentage of the available force of the piezoactuator can be invested in the production of a larger stroke and therefore in a high nominal width of the valve. It follows that an improvement is achieved with regard to the reproducability in the production of the valves as well as with regard to the long-term behaviour of the valves.

What is claimed is:

1. A microvalve comprising:

a base element provided with a passage opening;

a tappet;

a suspension device by means of which the tappet can be guided relative to the base element in such a way that the passage opening can be closed or opened by said tappet; and a piezoelectric actuator for actuating the tappet, the longitudinal dimensions of said piezoelectric actuator being adapted to be changed by the application of an electric voltage;

wherein longitudinally spaced ends of the piezoelectric actuator are connected to longitudinally spaced ends of the suspension device in such a way that the suspension device constitutes a means for providing a mechanical translation between the actuator and the tappet, wherein a change in the longitudinal dimensions of the piezoelectric actuator caused by the application of an electric voltage to said piezoelectric actuator is mechanically translated by said suspension device into a movement of the tappet essentially at right angles to said longitudinal direction whereby the passage opening will be opened or closed, and wherein the suspension device is secured, at at least two spaced points thereof, to the base element with the aid of hingelike means.

2. A microvalve according to claim 1, wherein the suspension device and the tappet are formed integrally from a micromechanically structured chip.

3. A microvalve according to claim 2, wherein the micromechanically structured chip is a semiconductor chip.

4. A microvalve according to claim 2, wherein the micromechanically structured chip is of plastic material.

5. A microvalve according to claim 2, wherein the micromechanically structured chip is connected to the piezoelectric actuator in at least two spaced portions along the periphery thereof, said micromechanically structured chip including one or a plurality of portions of reduced thickness, which constitute the suspension device, and one portion of increased thickness which is arranged between the two chip ends connected to the piezoelectric actuator and which constitutes the tappet.

6. A microvalve according to claim 2, wherein the micromechanically structured chip is provided with a peripheral projection projecting in at least two spaced portions along the periphery of said chip on the side facing away from the piezoelectric actuator, the micromechanically structured chip being secured to the base element by means of said peripheral projection.

7. A microvalve according to claim 6, wherein the base element is provided with a second passage opening which is arranged in an area of said base element determined by the peripheral projection of the micromechanically structured chip.

8. A microvalve according to claim 1, wherein the suspension device is attached to the base element by means of at least one hinge.

9. A microvalve according to claim 1, wherein the tappet leaves the passage opening open when no electric voltage is applied to the piezoelectric actuator and closes said passage opening when a voltage is applied to said piezoelectric actuator.

10. A microvalve according to claim 1, wherein the tappet closes the passage opening when no voltage is applied to the piezoelectric actuator and leaves said passage opening open when a voltage is applied to said piezoelectric actuator.

11. A microvalve according to claim 1, wherein the piezoelectric actuator is attached to a casing component by a fastening device on the side facing away from the tappet and the suspension device, said actuator being additionally provided with at least one passage opening which is in fluid communication with a passage opening in the casing component via the fastening device, said tappet closing the passage opening in the piezoelectric actuator at a first end position and the passage opening in the base element at a second end position, and said tappet being movable to said first and second end positions when a voltage is applied to or removed from the piezoelectric actuator.

12. A microvalve comprising:

a base element provided with a passage opening;

a tappet;

a suspension device by means of which the tappet can be guided relative to the base element in such a way that the passage opening can be closed or opened by said tappet; and a piezoelectric actuator for actuating the tappet, the longitudinal dimensions of said piezoelectric actuator being adapted to be changed by the application of an electric voltage, wherein the tappet closes the passage opening when no electric voltage is applied to the piezoelectric actuator and leaves said passage opening open when a voltage is applied to said piezoelectric actuator, wherein the piezoelectric actuator is attached to the base element by a fastening device on the side facing away from the tappet and the suspension device, said piezoelectric actuator being provided with at least one passage opening which is in fluid communication with the passage opening in the base element via the fastening device, and said tappet closing the passage opening of said base element by closing the passage opening of the actuator, wherein longitudinally spaced ends of the piezoelectric actuator are connected to longitudinally spaced ends of the suspension device in such a way that the suspension device constitutes a means for providing a mechanical translation between the actuator and the tappet, wherein a change in the longitudinal dimensions of the piezoelectric actuator caused by the application of an electric voltage to said piezoelectric actuator is mechanically translated by said suspension device into a movement of the tappet essentially at right angles to the longitudinal direction whereby the passage opening will be opened.

13. A microvalve according to claim 12, wherein the suspension device and the tappet are formed integrally from a micromechanically structured chip.

14. A microvalve according to claim 13, wherein the micromechanically structured chip is connected to the piezoelectric actuator in at least two spaced portions along the periphery thereof, said micromechanically structured chip including one or a plurality of portions of reduced thickness, which constitute the suspension device, and one portion of increased thickness which is arranged between the two chip ends connected to the piezoelectric actuator and which constitutes the tappet.

15. A microvalve according to claim 12, wherein the micromechanically structured chip is a semiconductor chip.

16. A microvalve according to claim 12, wherein the micromechanically structured chip is of plastic material.

* * * * *